United States Patent [19]

Hashimoto

[11] Patent Number: 4,591,899

[45] Date of Patent: May 27, 1986

[54] COLOR IMAGE PICKUP DEVICE

[75] Inventor: Seiji Hashimoto, Kanagawa, Japan

[73] Assignee: Canon Kabushiki Kaisha, Tokyo, Japan

[21] Appl. No.: 476,242

[22] Filed: Mar. 17, 1983

[30] Foreign Application Priority Data

Mar. 25, 1982 [JP] Japan .................................. 57-47809
Apr. 1, 1982 [JP] Japan .................................. 57-54380

[51] Int. Cl.$^4$ .............................................. H04N 9/07
[52] U.S. Cl. ........................................ 358/41; 358/50; 358/44
[58] Field of Search ............................. 358/41, 44, 50

[56] References Cited

U.S. PATENT DOCUMENTS 4,106,056 8/1978 Nagumo .................................. 358/50
4,249,203 2/1981 Yamanaka ............................ 358/50

Primary Examiner—Michael A. Masinick
Attorney, Agent, or Firm—Toren, McGeady, Stanger, Goldberg & Kiel

[57] ABSTRACT

Disclosed is a color image pickup device comprising an image pickup device for converting the image beam obtained through the color separating filter into an electrical signal, a detecting device for detecting the signal amount near the sampling frequency of a certain determined color of the color separating filter from the outputs of the image pick up device or detecting device for detecting the color saturation of the object image and band control means for limiting the brightness signal band of the object image in accordance with the output of the detecting device.

26 Claims, 11 Drawing Figures

FIG.4
(a)
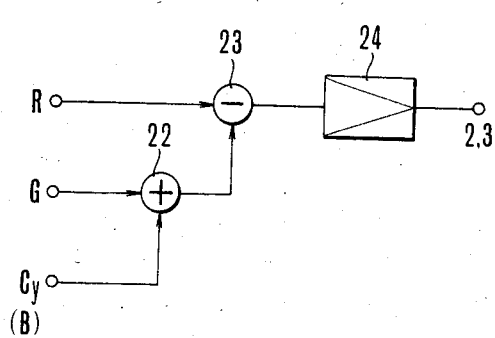
(b)
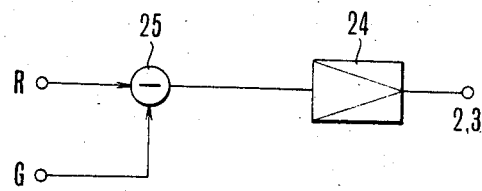
(c)
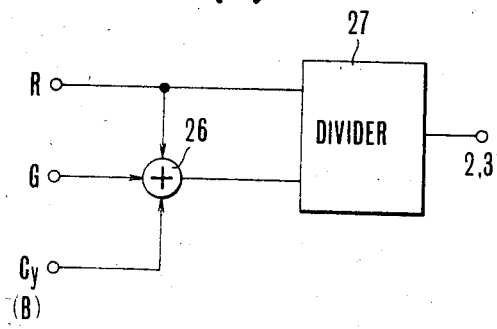

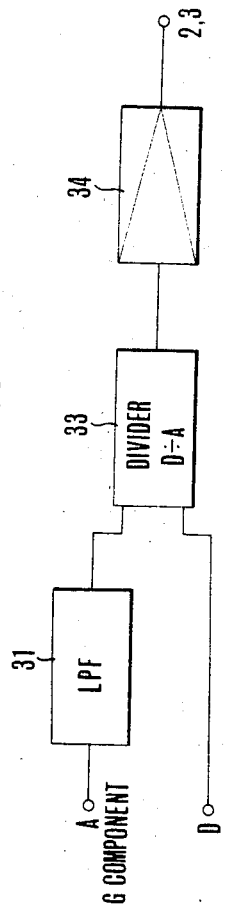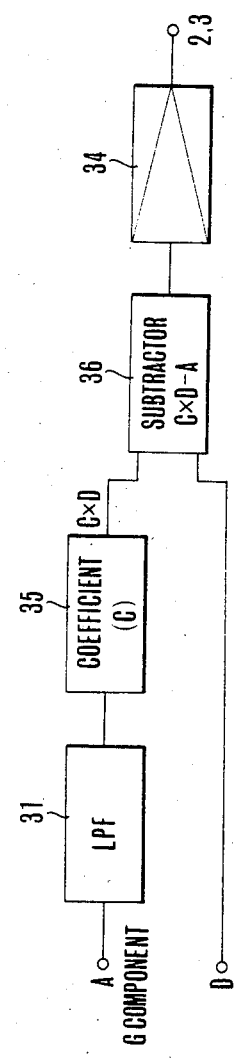

COLOR IMAGE PICKUP DEVICE

BACKGROUND OF THE INVENTION

1. Field of the Invention

The present invention relates to an improvement of a color image pickup device.

2. Description of the Prior Art

A color image pickup device of a type, for example, as shown in FIG. 1, in which a stripe filter consisting of a repeated arrangements of the R(red), the Cy(cyan) and the G(green) filters are provided in front of the light sensing part of the solid image pickup element, wherein each color filter is made to correspond to each of pitches of the picture elements of the image pickup element, is known.

When the horizontal reading out clock frequency of the image pickup element having such a filter as described above is let to be fR, there exists a carrier of each color signal in a deviated state, as shown in FIG. 2, wherein the phase is deviated by $\frac{2}{3}\pi$ at the position of $\frac{1}{3}$ fR.

When the synthetic optical characteristics of a system comprising image pickup elements, color filters and so on are set in such a manner that the output of the image pickup element can be obtained evenly for every color component when an object image with zero color saturation is picked up, the vectors of the side wave band signals of individual colors at $\frac{1}{3}$ fR in FIG. 2 are compensated by each other so that there takes place no inclusion of the side wave band component into the base band component used as the brightness signal, the so-called "Folding noise".

Although originally such a balance effect is obtained only for a colorless object, the signals are practically treated in a band of frequency higher than the Nyquist's frequency for each color signal because the color saturation of the picked up object image is normally low.

However, when an object with high color balance is in the picture, the sampling frequency is lowered to $\frac{1}{3}$ fR so that the Nyquist's frequency is also lowered to 1/6 fR. Thus, for the object image having a spacial frequency component above 1/6 fR, there takes place a folding noise, which deteriorates the picture quality.

On the other hand, it is known that, visually, not so great a resolution power is required for an object with high color saturation.

SUMMARY OF THE INVENTION

It is, accordingly, an object of the present invention to provide an image pickup device improved in so that there takes place no Moire or the like even for an object with high color saturation.

For this, the embodiments of the present invention are provided with detecting means for detecting the color saturation of the object image from the output signal of the solid image pickup element and band control means for controlling the band of the brightness signal in accordance with the color saturation.

Namely, where the color saturation is high, for example, the band of the brightness signal is controlled to be so narrow that the inclusion of the side wave band component can be prevented.

Further, the band control can be carried out by a simple construction by making use of a low pass filter, for example, capable of contacting the cut off frequency as the band control means for controlling the band of the brightness signal. Still further, a low pass filter normally used for separating the brightness signal from the output of the image pickup element can be used in common with the low pass filter as the band control means of the present invention so that the construction can be made much more simple. Further, in order to detect the color saturation, the embodiment of the present invention is provided with detecting means for detecting the output signal amount of the image pickup means near the sampling frequency for a certain determined color signal. In this way, the color saturation can be detected in a simple way.

Namely, as described above, for an object with low color saturation, the side wave band components of each color signal having $\frac{1}{3}$ fR which is the spacial frequency of the color separating filter as the carrier are balanced so as to be compensated with each other, while for an object with high color saturation, there is obtained no such balance and the side wave band component for a certain determined color signal increases near $\frac{1}{3}$ fR.

Thus, the color saturation can be detected by comparing the level of the signal component in the neighborhood of $\frac{1}{3}$ fR, for example, with that of all of the signals.

Further, by extracting the signal component of the color signal near the sampling frequency and comparing it with others in this way, not only the color saturation for a certain determined color, but also the color saturation level for any color can be detected.

Other objects and features of the present invention will be clear from the following description made below with reference to the accompanying drawings.

BRIEF DESCRIPTION OF THE DRAWINGS

FIGS. 4(a), (b) and (c) respectively show a color saturation detecting circuit of the present invention.

FIG. 6 shows the first embodiment of the detecting circuit 30 in FIG. 5.

FIG. 7 shows the second embodiment of the detecting circuit 30 in FIG. 5.

DETAILED DESCRIPTION OF THE PREFERRED EMBODIMENTS

Figure 1:
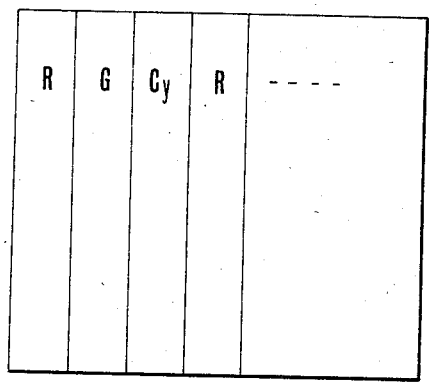
FIG. 1 shows an example of the stripe filter of the present invention.

Below, the present invention will be described in detail with reference to the embodiment thereof in FIG. 3. in the drawing, 1 is an image pickup device as image pickup means for converting the object image into an electrical signal. For this, a CCD or XY address sensor of MOS type can be applied. Further, an image pickup tube can also be applied.

On the light sensing face of the image pickup device, a color separating optical means consisting of a plural number of color filters with different color spectrographic characteristics as shown in FIG. 1 are arranged.

Needless to say instead of one a plural number of image pickup devices can be arranged. In this case, for the color separating optical system, a dichroic mirror or the like can be used in order to separate colors.

2 is a variable low pass filter used as the frequency characteristic control means according to the present invention. The filter is controlled in such a manner that the cut off frequency lowers in accordance with the increase of the level of the control input signal.

3 is the variable delay circuit of the present invention for compensating the phase deviation of the brightness signal due to the above low pass filter and keeping the phase relation of the brightness signal to the chroma signal constant.

The delay circuit is designed in such a manner that, in accordance with the increase of the level of the control input signal, the delay amount decreases, whereby the delay amount due to the variable low pass filter and the delay circuit is controlled so as to coincide with that due to the low pass filters 18 and 19.

4 is a $\gamma$ compensation circuit for carrying out the $\gamma$ compensation for the Y signal. 5 is an aperture compensation circuit for raising up the high band characteristics.

6, 7 and 8 are respectively a sample hold circuit for separating the color signals of R, G and Cy, 12 a subtractor for obtaining the B (blue) signal by the deduction of (Cy−G), 9–11 respectively a white balance circuit for obtaining the white balance of the color signals of R, G and B and 13–15 $\gamma$ compensating circuits for obtaining the $\gamma$ compensation of the color signals.

16 and 17 are subtractors for forming the signals (R−G) and (B−G). 18 and 19 are low pass filters for limiting the color difference band for example below 500 KHz. 20 is an encoder for forming the NTSC signal from the brightness signal, the color difference signal and the synchronization signal and so on.

21 is a color saturation detecting circuit used as the detecting means of the present invention, being designed as shown in FIGS. 4(a), (b) and (c). In FIG. 4(a), 22 is an adder for obtaining the signal (G+Cy), 23 a subtractor for deducting (G+Cy) from R and 24 the amplifier circuit.

Consequently, from the output of the amplifier circuit 24 the difference between the R signal and other color signal $(R-G-Cy)=(R-2G-B)$ can be obtained.

The reason why the difference between the R signal and the remaining color signals can be taken as the color saturation level will be explained below. Namely, the ratio at which the G filter occupies in the color filters is generally twice as high as that at which the R filter or the B filter does. This is because the visual sensitivity is high for the G component.

That is, the space frequency of the G filter is about twice as high as that of the R filter or the B filter, so that when the image pickup device is scanned, the sampling frequency of G is about twice as high as that of R, while the Nyquist's frequency for the G signal is also twice as high as that for the R signal.

Further, the above-mentioned folding noise is most apparent for the R component, and it is also apt to take place even for objects with low spacial frequency.

However, the visual sensitivity for the B component is low and the Moiré is comparatively small and can be neglected.

From the above view point, as the color saturation the ratio of the Y component to the R component or the level of (R−Y) can be detected.

In short, the color saturation can be the ratio of the R component to the Y component or the difference therebetween.

What is important here is to compare the R component with other principal color component.

FIGS. 4(b) and (c) are respectively an embodiment from the above view point. In the embodiment shown in FIG. 4(b), the level of (R−G) is taken as the color saturation, wherein 25 is the adder. In the embodiment shown in FIG. 4(c) the signal (R+G+Cy) is once obtained by the adder 26 and the R signal is compared with the above (R+G+Cy) signal by the divider 27 so as to obtain the color saturation signal.

Figure 3:
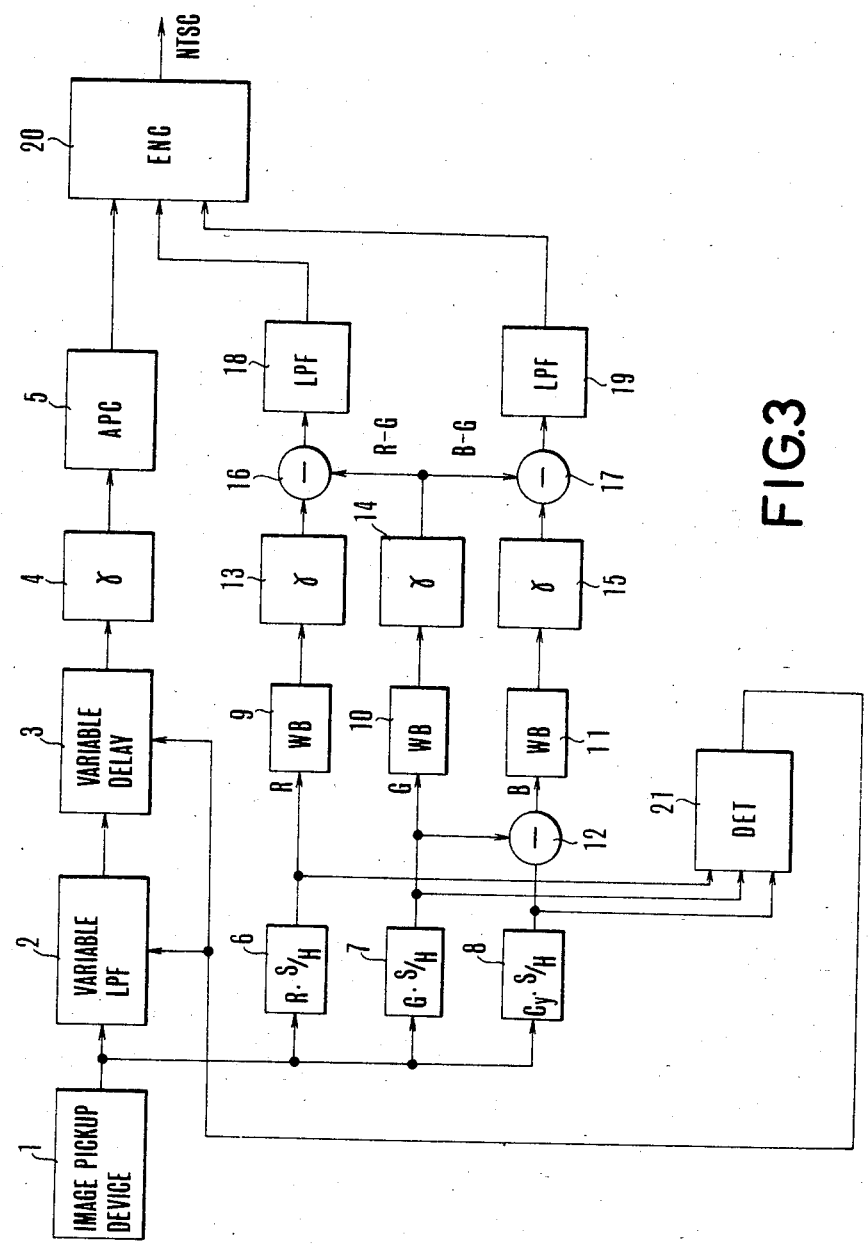
FIG. 3 shows a block diagram of the first embodiment of the present invention.

Further, in the block diagram in FIG. 3, the output signal of the sample hold circuit for each color signal is input into the color saturation detecting circuit 21, whereby, for example, in the case of the embodiment in FIG. 4(b), the signal (R−G) is taken as the color saturation signal so that the output of the subtractor 16 in FIG. 3 can be used as the color saturation signal. Further, in the embodiment in FIG. 3 (R−G) and (B−G) are taken as the color difference signal, but it is clear from the principle of FIG. 4(c) that the signal (R−Y) can be used as the color saturation signal in a system in which as the color difference signal (R−Y) and (B−Y) are used.

Further, although in the embodiment in FIG. 3 the R filter, the G filter and the Cy filter are used, the color saturation detecting systems in FIGS. 4(a) and (c) can be established even when the R filter, the G filter and the B filter are used.

Further, in order to simplify the construction, a low pass filter capable of controlling the cut off frequency is used as the frequency characteristics control means of the present invention. However, needless to say, the present invention is not limited to such.

Although not shown in the drawing, it can be the trap circuit which lowers the gain near a certain determined frequency, whereby the frequency characteristics of the trap circuit is varied in accordance with the color saturation level.

Figure 2:
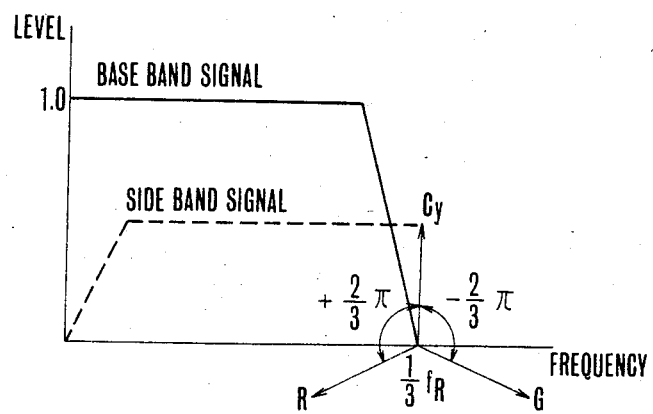
FIG. 2 shows the balance effect.

In this case, for example, the trap frequency is set at the spacial frequency of the R filter, namely near the $\frac{1}{2}$ fR in FIG. 2 in such a manner that the trap width is widened accordingly as the color saturation level rises.

Further, it goes without saying that the control mode can be such that the band is limited when the color saturation level surpasses a certain determined value or such that the band is changed over in a step-wise fashion in accordance with the color saturation level.

As is described above in detail in accordance with the present invention, an image pickup device having image pickup means combined with color separating optics can be realised in such a manner that a high picture quality can always be obtained without any folding noise even when an image with high color saturation is picked up.

Hereby, the construction is simple, and a part of the conventional signal process circuit (for example low pass filter) can be conveniently used in common.

Further, the color deviation does not take place when the frequency characteristics of the signal from the image pickup means is varied by the frequency characteristic control means because the phase deviation is compensated by the variable delay circuit.

Further, the color saturation detecting method is so simple that the manufacturing is very simple, and a part of the output of the signal process circuit can be conveniently used.

Figure 5:
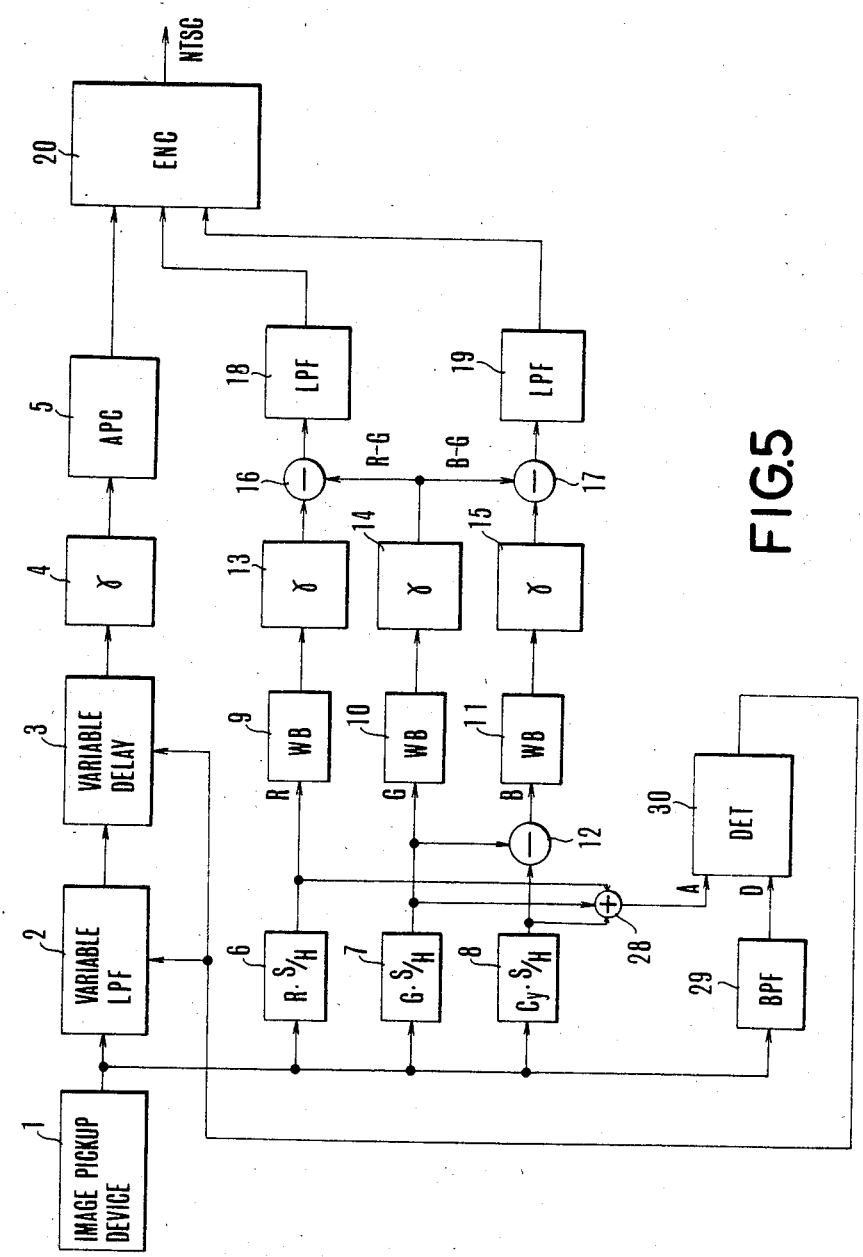
FIG. 5 shows the block diagram of the second embodiment of the present invention.

FIG. 5 shows the second embodiment of the present invention, wherein the members having the same figures as those in FIG. 4 are the same members.

28 is an adder which produces a Y signal A consisting of $(R+G+Cy)=(R+2G+B)$. 29 is a band pass filter for extracting the signal component near the sampling frequency of the color signal and 30 a detecting circuit for detecting the color saturation by comparing the level of the above Y signal A with that of the output D from the band pass filter.

Such a detecting circuit can be designed in such a manner that as is shown in FIG. 6, the output signal D is divided by the output A of the adder after having passed the low pass filter 29 by the divider 33 ($D \div A$) and then amplified by the amplifier 34 or that, as is shown in FIG. 7, the signal A is detected by the low pass filter 31 and multiplied with the coefficient C in the coefficient circuit 35 in such a manner that the difference between the output of the coefficient circuit 35 and the signal D is obtained by the subtractor 36 and then amplified.

Further, in this case instead of the output A the G signal or other signal having G as the main component can be used.

The reason is that the color arrangement characteristics of the color filter is normally set so as to include more of the R component than the R or the B component.

What is important is that the output A is the main output signal from the image pickup element.

Further, in the embodiment shown in FIG. 5 the R, the G and the Cy filters are used, whereby the filter as the color separating optics can be constructed in any way.

In comparison with the embodiment shown in FIG. 3, in accordance with the present embodiment not the saturation of a certain determined color but that of all the color component can be easily detected so that the color saturation can be detected surely under any condition.

Figure 8:
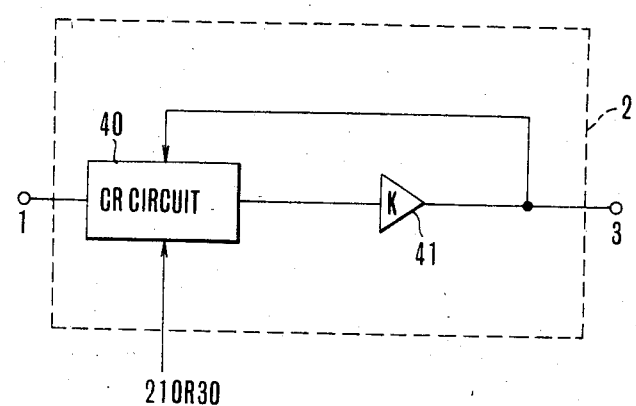
FIG. 8 shows an example of the low pass filter as the frequency characteristic control means of the present invention.

Further, FIG. 8 shows an embodiment of the variable low pass filter 2 in FIGS. 3 and 5, wherein the rising up characteristics near the cut off frequency is made sharp by the active filter.

In the drawing, 40 is the CR circuit whose CR time constant varies in accordance with the output level of the detecting circuit 21 or 30, being so designed as to control in such a manner that the higher the output level of the detecting circuit 21 or 30 is, namely the higher the color saturation is, the lower the cut off frequency is. 41 is an amplifier, whose output is fed back to the CR circuit so as to make the rising up characteristics sharp. Hereby, the frequency characteristic control means of the present invention can be any filter capable of controlling the cut off frequency and need not to be limited to the construction as is shown in FIG. 8.

Figure 9:
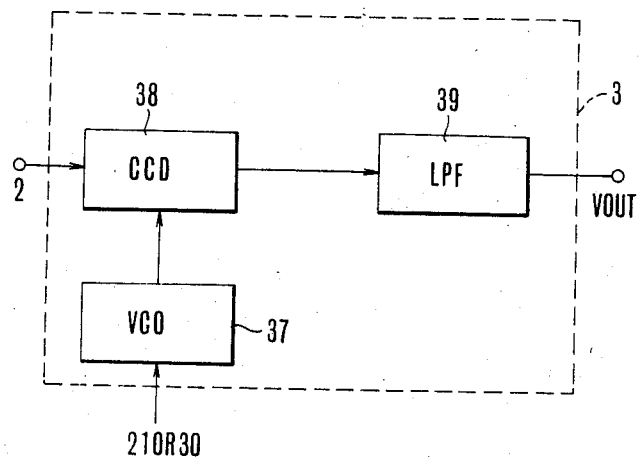
FIG. 9 shows an example of the variable delay circuit as the phase characteristic control means of the present invention.

FIG. 9 shows an embodiment of the variable delay circuit 3 as the phase characteristics control means of the present invention shown in FIGS. 3 and 5. In the drawing, 37 is a voltage control oscillator whose oscillation frequency varies in accordance with the output voltage level of the detecting circuit 21 or 30. In accordance with the present embodiment the control is so carried out that the higher the output voltage level of the detecting circuit 21 or 30, namely the color saturation is, the higher the oscillation frequency is. 38 is the CCD delay circuit which is driven with the driving pulses corresponding to the output frequency of the above voltage control oscillator 37.

The output of the CCD delay circuit 38 is taken out, after being smoothed by the low pass filter 39.

Thanks to the above construction, the higher the color saturation is, the smaller the delay amount is. Thus, the higher the color saturation is, the lower the cut off frequency of the frequency characteristic control means of the present invention is, so that the delay of the signal is compensated by this variable delay circuit 3.

Hereby, the variable delay circuit 3 can be of the type which controls the delay circuit by varying the capacity of the delay line.

What I claim:

1. A color image pickup device comprising:
   (a) image pickup means for converting an optical image into an electrical image signal, said signal including a plural number of color signal components;
   (b) detecting means for detecting relative ratios of color signal components included in an output signal of the image pickup means; and
   (c) control means for controlling the frequency characteristic of the output signal of the image pickup means in accordance with the output of the detecting means.

2. A color image pickup device according to claim 1, wherein the image pickup means includes an image pickup device combined with a color separating filter.

3. A color image pickup device according to claim 2, wherein the color separating filter includes a plural number of color filters with color spectrographic characteristics different from each other.

4. A color image pickup device according to claim 1, wherein the detecting means includes comparison means for comparing levels of at least a part of the plural number of the color signal components.

5. A color image pickup device according to claim 4, wherein the detecting means includes subtracting means for producing a difference signal between at least a part of the plural number of the color signal components.

6. A color image pickup device according to claim 1, wherein the detecting means detects the ratio of a red signal component to the output of the image pickup means.

7. A color image pickup device according to claim 1, wherein the detecting means compares the level of a red signal component in the output of the image pickup means with that of a brightness signal formed of the output of the image pickup means.

8. A color image pickup device according to claim 1, wherein the detecting means compares the level of a red signal component in the output of the image pickup means with the level of a green signal component.

9. A color image pickup device according to claim 1, wherein the control means includes a frequency filter allowing passage of a certain determined frequency component therethrough.

10. A color image pickup device according to claim 9, wherein the control means includes a low pass filter.

11. A color image pickup device according to claim 1, wherein the control means controls a high band cut off frequency of the output signal of the image pickup device in accordance with an unbalanced state of a plural number of the color signal components contained in the output of the image pickup device.

12. A color image pickup device according to claim 1, wherein the image pickup device includes means for compensating variation of phase characteristics due to variation of frequency characteristics of the output signal of the image pickup means.

13. A color image pickup device according to claim 1, wherein the detecting means compares a level of a certain determined frequency component in the output signal of the image pickup means with that of the output signal of the image pickup means.

14. A color image pickup device according to claim 1, wherein the detecting means compares a level of a certain determined frequency component in the output signal of the image pickup means with that of a brightness signal formed of the output signal of the image pickup means.

15. A color image pickup device according to claim 1, wherein the detecting means compares a level of a certain determened frequency component in the output signal of the image pickup means with that of a green signal component in the output signal of the image pickup means.

16. A color image pickup device comprising:
 (a) image pickup means for converting an optical image into an electrical signal;
 (b) color separation means for separating a plurality of color signals from the electrical signal converted by said image pickup means;
 (c) detecting means for detecting color saturation of the plurality of color signals separated by said color separation means; and
 (d) control means for controlling the frequency characteristics of said electrical signals of said image pickup means corresponding to the color saturation of color signals detected by said detecting means.

17. A color image pickup device according to claim 16, wherein said image pickup means includes a solid image pickup element or elements.

18. A color image pickup device according to claim 17, wherein said color separation means includes a sample and hold circuit.

19. A color image pickup device according to claim 16, wherein said detecting means detects difference between said plurality of color signals.

20. A color image pickup device according to claim 6, wherein said detecting means detects a color saturation of the color signals.

21. A color image pickup device according to claim 16, further comprising brightness signal forming means for forming a brightness signal from the electrical signal converted by said image pickup means, wherein said control means controls the frequency characteristics of said brightness signal.

22. A color image pickup device according to claim 21, wherein said control means controls a relatively high frequency component of said brightness signal.

23. A color image pickup device according to claim 22, wherein said control means limits a relatively high frequency component of the brightness signal when levels of the plurality of color signals are detectd by said detecting means as being out of balance from each other.

24. A color image pickup device according to claim 16, further comprising compensating means for compensating phases of signals which have their frequency characteristics controlled by said control means.

25. A color image pickup device according to claim 24, wherein said compensating means includes variable delay means.

26. A color image pickup device comprising:
 (a) color image pickup means which has a plurality of picture elements and has a prescribed color filter provided for each one of said picture elements;
 (b) detecting means for detecting a color saturation of outputs of said image pickup means; and
 (c) control means for controlling a frequency band of said color image pickup means corresponding to the outputs of said detecting means, said control means relatively limiting a frequency band when the color saturation detected by said detecting means is comparatively high and relatively expanding the frequency band when said color saturation is relatively low.

* * * * *